United States Patent
Gan et al.

(10) Patent No.: US 11,125,514 B2
(45) Date of Patent: Sep. 21, 2021

(54) SYSTEMS AND METHODS FOR PASSIVE COOLING AND RADIATOR FOR SAME

(71) Applicants: The Research Foundation for The State University of New York, Buffalo, NY (US); Wisconsin Alumni Research Foundation, Madison, WI (US)

(72) Inventors: Qiaoqiang Gan, East Amherst, NY (US); Haomin Song, Williamsville, NY (US); Zongfu Yu, Madison, WI (US); Ming Zhou, Madison, WI (US)

(73) Assignees: The Research Foundation for The State University of New York, Buffalo, NY (US); Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 17/045,415

(22) PCT Filed: Apr. 4, 2019

(86) PCT No.: PCT/US2019/025913
§ 371 (c)(1),
(2) Date: Oct. 5, 2020

(87) PCT Pub. No.: WO2019/195637
PCT Pub. Date: Oct. 10, 2019

(65) Prior Publication Data
US 2021/0055066 A1    Feb. 25, 2021

Related U.S. Application Data

(60) Provisional application No. 62/652,886, filed on Apr. 4, 2018.

(51) Int. Cl.
*F28F 21/06* (2006.01)
*F25B 39/04* (2006.01)

(52) U.S. Cl.
CPC ............ *F28F 21/067* (2013.01); *F25B 39/04* (2013.01)

(58) Field of Classification Search
CPC ........ F28F 21/067; F28F 13/18; F28F 13/182; F25B 39/04
See application file for complete search history.

(56) References Cited

U.S. PATENT DOCUMENTS

| 4,286,009 A | 8/1981 | Griest |
| 4,356,815 A | 11/1982 | Spanoudis |

(Continued)

FOREIGN PATENT DOCUMENTS

WO    WO-2016205717 A1 * 12/2016 ............ F24S 70/225

OTHER PUBLICATIONS

Raman, A.P., et al., Passive radiative cooling below ambient air temperature under direct sunlight, Nature, Letter, Nov. 27, 2014, vol. 515, pp. 540-544.

(Continued)

*Primary Examiner* — Tho V Duong
(74) *Attorney, Agent, or Firm* — Hodgson Russ LLP

(57) ABSTRACT

Disclosed herein are systems and methods for passively cooling water vapor to enable efficient condensation, and methods of making such systems. A passive cooler can include a thermally conductive substrate having a first side and a second side opposite the first side, a coating disposed on at least a portion of the first side of the substrate, and a housing having one or more insulative walls. The insulative walls may define a vapor flow channel from an inlet to an outlet of the housing such that the second side of the substrate is exposed to water vapor flowing through the vapor flow channel.

21 Claims, 10 Drawing Sheets

(56) References Cited

U.S. PATENT DOCUMENTS

| | | | |
|---|---|---|---|
| 4,416,264 | A | 11/1983 | Herrick et al. |
| 4,582,764 | A | 4/1986 | Allerd et al. |
| 4,628,905 | A | 12/1986 | Mills |
| 5,332,888 | A | 7/1994 | Tausch et al. |
| 5,523,132 | A | 6/1996 | Zhang et al. |
| 8,707,947 | B2 | 4/2014 | Hollis et al. |
| 8,783,246 | B2 | 7/2014 | Lu et al. |
| 9,923,111 | B2 | 3/2018 | Fan et al. |
| 10,093,552 | B2 | 10/2018 | Lee |
| 2002/0073988 | A1 | 6/2002 | Reichert et al. |
| 2012/0107625 | A1 | 5/2012 | Smith et al. |
| 2014/0102509 | A1* | 4/2014 | Eickelmann ........ H01L 31/0749 136/246 |
| 2015/0308717 | A1 | 10/2015 | Rochier et al. |
| 2015/0338175 | A1* | 11/2015 | Raman .................... F28F 13/18 165/185 |
| 2016/0084532 | A1 | 3/2016 | Tsutsui et al. |
| 2016/0103256 | A1* | 4/2016 | Millar .................. G02B 5/0858 235/468 |
| 2016/0363396 | A1* | 12/2016 | Liu ........................... F28B 1/06 |
| 2017/0248381 | A1* | 8/2017 | Yang ....................... F28F 13/18 |
| 2018/0180331 | A1 | 6/2018 | Yu et al. |
| 2018/0354848 | A1 | 12/2018 | Van Overmeere et al. |
| 2019/0064393 | A1* | 2/2019 | Suemitsu ................. H01K 1/04 |

OTHER PUBLICATIONS

Kou, J., et al., Daytime radiative cooling using near-black infrared emitters, ACS Photonics, Feb. 3, 2017, 14 pages.

Nilsson, T.M.J., et al., Radiative cooling during the day: simulations and experiments on pigmented polyethylene cover foils, Solar Energy Materials and Solar Cells, 1995, vol. 37, pp. 93-118.

Zhou, M., et al., Accelerating vapor condensation with daytime radiative cooling, Cornell University, Applied Physics, Apr. 28, 2018, 15 pages. https://arxiv.org/abs/1804.10736v1.

* cited by examiner (a) Convective condenser

(b) Radiative condenser

Conventional solar still:

SYSTEMS AND METHODS FOR PASSIVE COOLING AND RADIATOR FOR SAME

CROSS-REFERENCE TO RELATED APPLICATIONS

This application claims the benefit of U.S. Provisional Patent Application No. 62/652,886, filed on Apr. 4, 2018, the disclosure of which is incorporated herein by reference.

STATEMENT REGARDING FEDERALLY SPONSORED RESEARCH

This invention was made with government support under contract no. 1561917 awarded by the National Science Foundation. The government has certain rights in the invention.

FIELD OF THE DISCLOSURE

The present disclosure relates to passive cooling for condensers.

BACKGROUND OF THE DISCLOSURE

Freshwater is the most important essence for sustaining life on earth. The amount of available freshwater for human consumption depends on rivers, lakes, and underground water reservoirs, which are only approximately 1% of the total water on earth. While the global demand for freshwater increases due to population growth, the amount of available freshwater continues to decreases due to increasing human activities, such as industrial waste and sewage discharges. Consequently, in 2015, water scarcity was determined to be the largest global risk over the following decade.

Most of current water-harvesting technologies are extremely energy demanding, and one fourth of the global population is facing water shortage because they cannot afford these technologies. The demand of efficient passive water harvesting that operates without additional power input is significant and urgent.

One of the most primitive ways of treating seawater and dirty water to convert them into freshwater is distillation. This procedure involves condensing evaporated water vapor into freshwater, and the condensation rate determines how efficient freshwater can be produced. On the other hand, water vapor is also abundant in nature. The surface water on Earth is continuously evaporated into water vapor by solar radiation. Humans also evaporate water for various purposes, for instance, evaporative cooling. These human activities produce huge amounts of water vapor. In principle, condensing such ambient water vapor can also provide a significant amount of freshwater. However, efficient condensation of water requires tremendous energy, making it unsuitable for developing regions which comprise the most water-stressed areas.

Tremendous efforts have been devoted to developing passive water collectors that do not require any energy input. Recently, there has been significant progress on solar stills, where the freely available solar energy is utilized to increase the evaporation rate. The evaporation rate can be as high as 1.3 $Lm^{-2}$ $h^{-1}$, where almost 88% of the solar radiation is utilized to evaporate water. However, the overall water production rate has been limited by the low water condensation rate. Most existing solar stills use forced convection as a passive cooling source, and the average condensation rate is only 0.25 $Lm^{-2}$ $h^{-1}$, which is only 20% of the evaporation rate. This low condensation rate has become a major barrier to realizing an efficient passive water condenser. The demand for a powerful passive cooling source for water condensation is significant.

Recently, there has been significant progress using the freely available solar energy for passive water harvesting. In these passive water-harvesting systems, surface water or water captured from the atmosphere is heated up and evaporated to water vapor by sunlight. To achieve efficient evaporation, most of these systems localize heat generation to the water-air interface to reduce heat losses. It has been demonstrated that heat-localizing solar evaporation systems can evaporate water at ~12 $Lm^{-2}$ $day^{-1}$. However, the amount of water harvested from these systems has been limited to ~2.5 $Lm^{-2}$ $day^{-1}$, no matter how fast they generate water vapor. Due to this relatively low water production, water-harvesting systems based on solar evaporation have not been widely used regardless of their long history. In order to produce enough freshwater to satisfy an individual's daily needs (~4 L $day^{-1}$), a large-area condensation system is usually required in these water-harvesting systems.

Nighttime radiative cooling has been a well-known passive cooling source since ancient times. In this cooling mechanism, heat is passively dissipated to outer space since Earth's atmosphere is partially transparent to mid-infrared radiation. A black emitter facing a clear sky thus can cool itself down to sub-ambient temperatures at nighttime by radiating in the mid-infrared spectral range. This mechanism has been utilized to collect dew water from wet air at night. However, demand for passive condensation is greatest during the day when solar radiation can be used for evaporation.

BRIEF SUMMARY OF THE DISCLOSURE

In this disclosure, a daytime radiative cooling scheme that can significantly accelerate water condensation is demonstrated. By combining the disclosed daytime radiative cooling technologies with conventional passive condensers, the maximum condensation rate can be accelerated significantly—in some embodiments, by ~2-5 times. The present disclosure provides a discussion and a description of an experiment conducted to demonstrate the improved water condensation under direct sunlight enabled by the technologies disclosed herein.

Passive water harvesting systems with radiative condensers can produce water at more than 8 L $m^{-2}$ $day^{-1}$, which is 3 times more than that of conventional passive condensers (~2.5 L $m^{-2}$ $day^{-1}$). Daytime passive condensation at ambient temperature, which is not possible without a radiative condenser, is also demonstrated herein.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
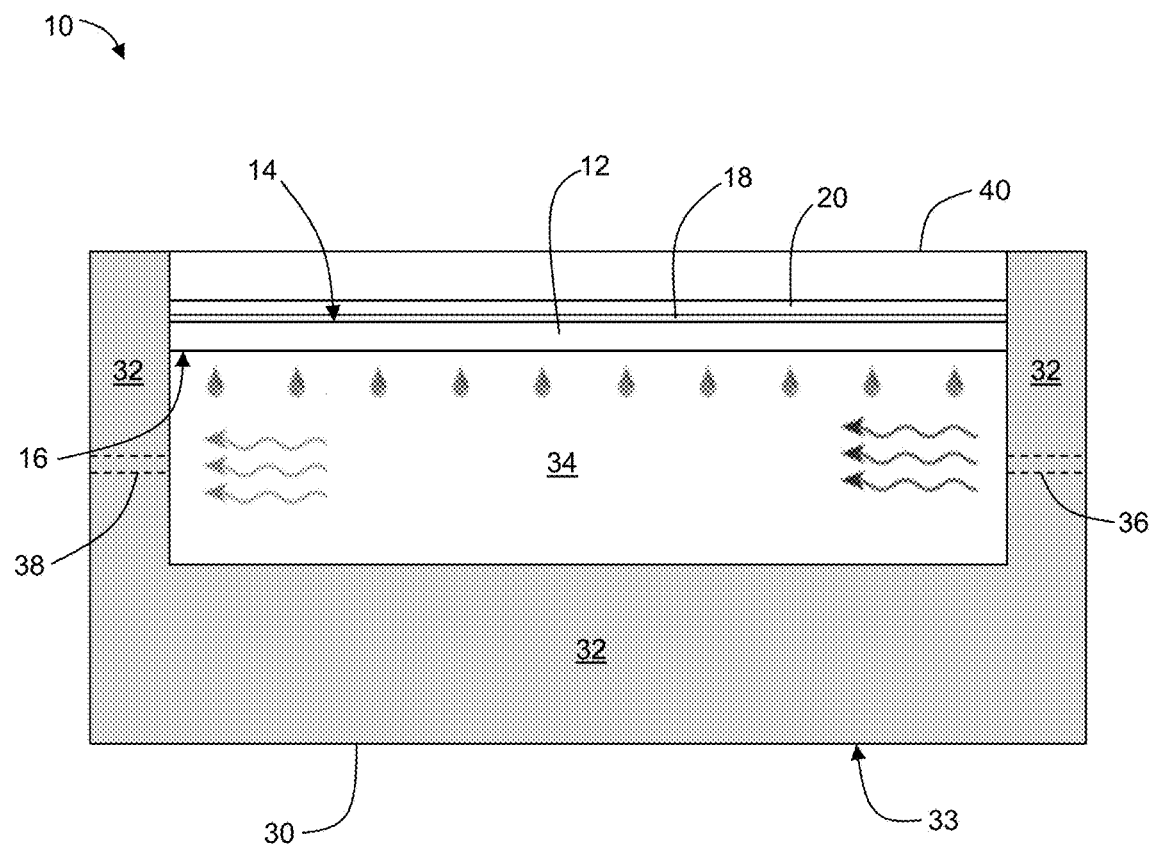
FIG. 1 is a drawing of a passive cooler according to an embodiment of the present disclosure.

The present disclosure may be embodied as a passive cooler 10 capable of utilizing the radiative cooling potential in a wide spectral band (see, for example, FIG. 1). Embodiments of the present cooler 10 may be advantageous for use in condensers, for example, to condense water vapor in a solar still. With reference to FIG. 1, the cooler 10 may have a thermally conductive substrate 12 having a first side 14 and a second side 16 opposite the first side. By thermally conductive, it is intended that a suitable substrate 12 may have a conductive heat transfer coefficient of at least 3 $Wm^{-2}K^{-1}$. In a non-limiting embodiment, the substrate 12 may be an aluminum plate having a thickness of 0.1 cm. Other embodiments may use other materials (such as, for example, glass, metals, etc.) and/or other thicknesses (greater or less). In some embodiments, the thickness of the substrate may be less than 3 mm.

The first side 14 of the substrate 12 may have a high solar reflectance. For example, in some embodiments, the solar reflectance may be at least 95%. In some embodiments, the substrate 12 may have a reflective layer 18 on the first side 14, such that the reflective layer 18 imparts the solar reflectance to the substrate 12. In the non-limiting embodiment of FIG. 1, the Aluminum substrate 12 may have a Silver reflective layer 18 with a thickness of 150 nm. Here again, reflective layers of other embodiments may use other materials (such as, for example, gold, etc.) and/or other thickness. For example, in some embodiments, the reflective layer may have a thickness of at least 100 nm. In some embodiments, no reflective layer may be necessary because the first side of the substrate may have a suitable solar reflectance without the need for a reflective layer.

The cooler 10 may further include a coating 20 disposed on at least a portion of the first side 14 of the substrate 12. The coating 20 may be transparent to solar radiation. For example, the coating 20 may have a solar transmittance of at least 95%. The coating 20 may have an emissivity greater than 0.95 (i.e., emitting over 95% of energy) over a majority of the spectral band having wavelengths from 4 μm to 25 μm. In an exemplary embodiment, the coating 20 may be polydimethylsiloxane ("PDMS"). The coating 20 may have a thickness of at least 50 μm. For example, in a non-limiting embodiment, a PDMS coating may have a thickness of 100 μm.

The cooler 10 may further include a housing 30 having one or more insulative walls 32. The insulative walls 32, together with the substrate 12, form a vapor flow channel 34 from an inlet 36 of the housing 30 to an outlet 38 of the housing 30. In the embodiment depicted in FIG. 1, three insulative walls 32 form three-sides of a four-sided vapor flow channel 34 and the substrate 12 forms the fourth side. In this way, the second side 16 of the substrate 12 will be exposed to vapor flowing through the channel 34. In some embodiments, each of the insulative walls 32 of the housing 30 have an exterior surface 33 that may be reflective to solar radiation. For example, in a non-limiting embodiment, each insulative wall 32 may have an exterior surface 33 made of foil. In some embodiments, the cooler 10 may further include a transparent cover 40 over the first side 14 of the substrate 12 and spaced apart from the first side 14. In this way, the formation of condensate on the first side of the substrate (i.e., on the coating) may be prevented or greatly reduced. The cover 40 may be, for example, a polyethylene film ("PE"). Other materials may be used and will be apparent in light of the present disclosure.

In another embodiment, the present disclosure may be a radiator for a condenser.

The radiator may have a thermally conductive substrate having a first side and a second side opposite the first side. By thermally conductive, it is intended that a suitable substrate may have a conductive heat transfer coefficient of at least 3 $Wm^{-2}K^{-1}$. In a non-limiting embodiment, the substrate may be a glass plate having a thickness of 0.1 cm. Other embodiments may use other materials (such as, for example, aluminum, other metals, etc.) and/or other thicknesses (greater or less). In some embodiments, the thickness of the substrate may be less than 3 mm.

The first side of the substrate may have a high solar reflectance. For example, in some embodiments, the solar reflectance may be at least 95%. In some embodiments, the substrate may have a reflective layer on the first side, such that the reflective layer imparts the solar reflectance to the substrate. Here again, reflective layers of some embodiments may use materials such as, for example, gold, silver, etc. In some embodiments, the reflective layer may have a thickness of at least 100 nm. In some embodiments, no reflective layer may be necessary because the first side of the substrate may have a suitable solar reflectance without the need for a reflective layer.

The radiator may further include a coating disposed on at least a portion of the first side of the substrate. The coating may be transparent to solar radiation. For example, the coating may have a solar transmittance of at least 95%. The coating may have an emissivity greater than 0.95 (i.e., emitting over 95% of energy) over a majority of the spectral band having wavelengths from 4 μm to 25 μm. In an exemplary embodiment, the coating may be polydimethylsiloxane ("PDMS"). The coating may have a thickness of at least 50 μm. For example, in a non-limiting embodiment, a PDMS coating may have a thickness of 100 μm.

Figure 5:
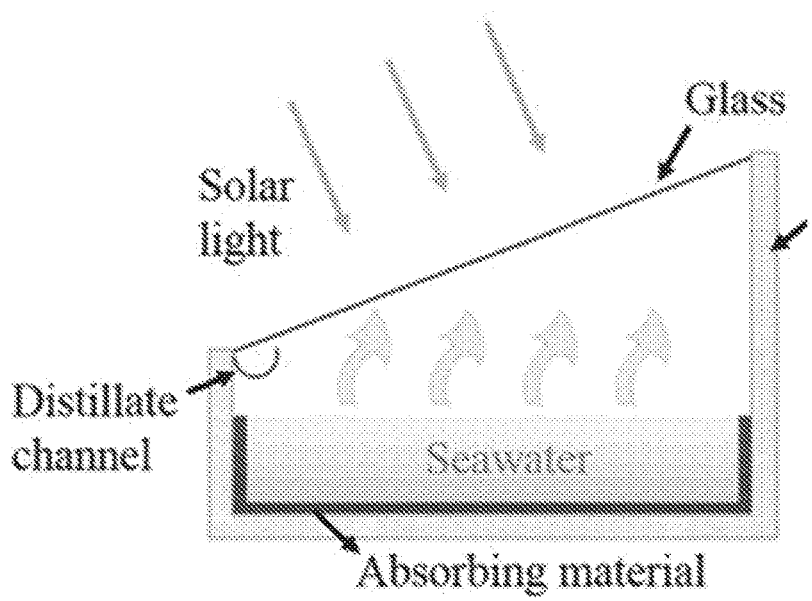
FIG. 5 is a schematic of a conventional solar still.

In a particular application, such a radiator may be used with a solar still such as that depicted in FIG. 5, as further described below.

In another aspect, the present disclosure may be embodied as a method of condensing water. The method includes providing a passive cooler of any of the embodiments described herein. Water vapor is passed through the vapor flow channel of the provided passive cooler. For example, the water vapor may be a portion of ambient air passed through the vapor flow channel. In this way, at least a portion of the water vapor condenses on the second side of the substrate of the passive cooler.

In another aspect, the present disclosure may be embodied as a method of making a passive cooler. A radiative cooling plate is formed by providing a thermally conductive substrate having a first side and a second side (opposite the first side). The first side has a solar reflectance of at least 95%. A coating is applied on the first side. The coating is transparent or substantially transparent to solar radiation and having emissivity of greater than 0.95 over a majority of the spectral band between 4 and 25 μm. The thermally-conductive substrate includes a reflective layer on the first side. The coating may be, for example, a silicon-based organic polymer, such as, for example, polydimethylsiloxane (PDMS).

The method further includes placing the radiative cooling plate within an opening of an insulating housing. The cooling plate is arranged such that an emission from the first side of the radiative cooling plate exits the insulating housing via the opening. Further, the cooling plate is arranged such that the second side of the cooling plate is exposed to a vapor flow channel of the housing.

In some embodiments, the method includes covering the opening with a transparent cover spaced apart from the first side of the substrate. The transparent cover may be, for example, a polymer film, such as, for example, a polyethylene film. In some embodiments, the method includes covering an external surface of the housing with a reflective layer. The reflective layer may be, for example, a reflective tape, such as, for example, an aluminized foil tape.

Further Discussion

Figure 2:
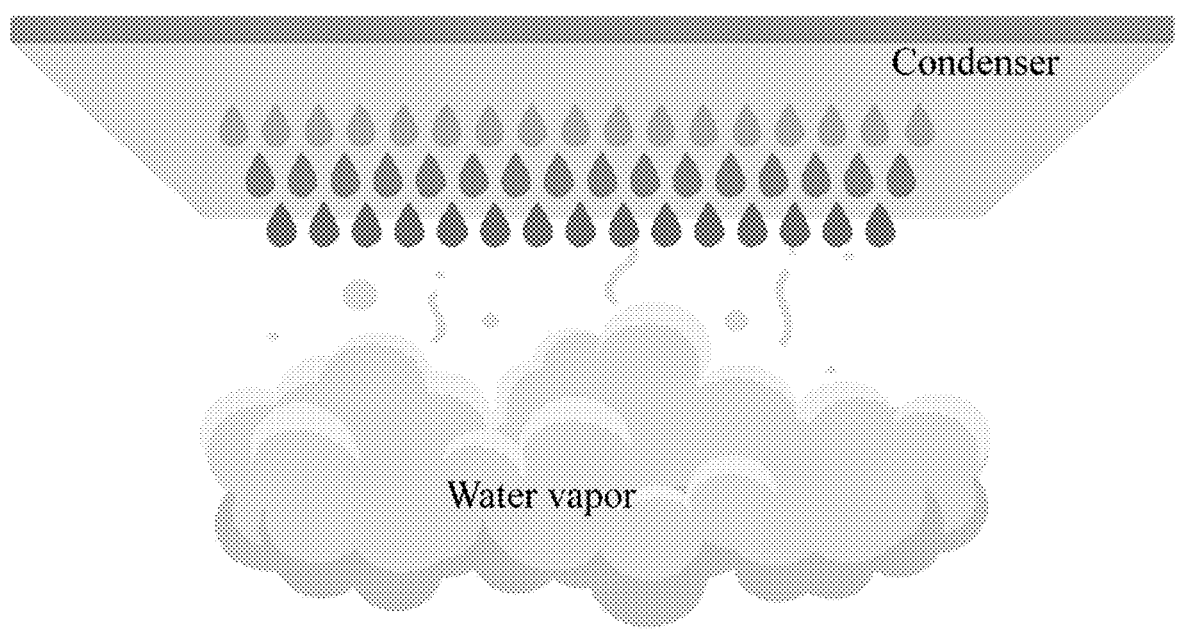
FIG. 2 is a schematic of a general condensation system.

Theoretical upper bound of radiative passive condensation. In general, when water vapor interacts with a passive condenser (FIG. 2), heat may be transferred from the water vapor to the condenser. As the condenser dissipates heat into surrounding environment and remains at a temperature lower than the temperature of the water vapor, it may condense water vapor and droplets of freshwater on the surface of the condenser (FIG. 2).

Figure 3:
FIG. 3 shows schematics of: (a) cooling mechanism in convective condenser; and (b) cooling mechanism in radiative condenser.
Figure 3:
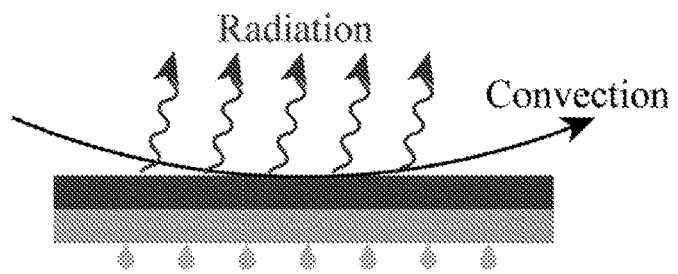

The condenser can dissipate heat through two major pathways: forced convection and radiation. In most of conventional passive condensers, forced convection may be the dominant cooling mechanism. The temperature of the condenser $T_{cond}$ usually is higher than the ambient temperature $T_{comb}$, but lower than the temperature of the water vapor $T_{vapor}$. As ambient air flows through over the top surface of the condenser (FIG. 3(*a*)), heat may be convectively transferred from the condenser to the ambient air, providing the cooling power required by condensation. The condensation rate thus can be approximately quantified by the convective cooling power $P_{conv} \cong h_c(T_{vapor}-T_{amb})A$, where A is the surface area of the condense-air interface. The convective heat transfer coefficient $h_c$ depends on the wind speed at the top surface of the condenser, which usually ranges from 3 to 10 $Wm^{-2}K^{-1}$ for wind speed from 0 to 10 mph without considering surface friction. Typically, the convective cooling power may be very limited. When there is no wind, the cooling power may be only 240 $Wm^{-2}$ for 100° C. water vapor at ambient temperature ($T_{amb}$=20° C.), which can only condense water at 0.38 L $m^{-2}$ $hour^{-1}$ (black dashed line in FIG. 4).

Moreover, it's very difficult to obtain 100° C. water vapor due to heat losses in realistic condensation systems. The temperature of water vapor in most of existing passive condensation systems may be below 60° C. As a result, the condensation rate may be only 0.63 L $m^{-2}$ $hour^{-1}$ even on a windy day with $h_c$=10 $Wm^{-2}K^{-1}$ (black solid line in FIG. 4). This low condensation rate ultimately limits the amount of water one can passively harvested.

Figure 4:
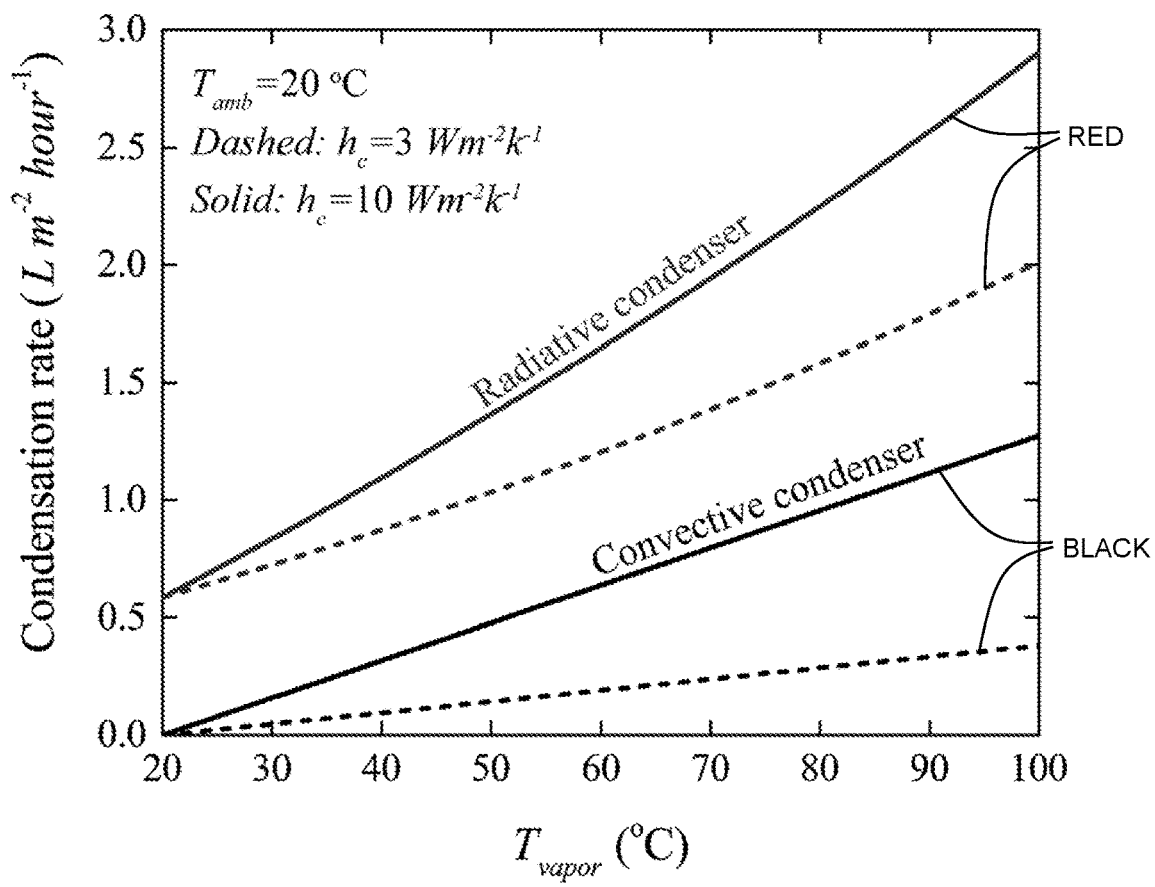
FIG. 4 is a chart showing the theoretical upper bound of condensation rates of convective condenser (black) and radiative condenser (red) (the ambient temperature is fixed at 20° C.)

Radiative condensers may have great potential to overcome the bottleneck just described above. In addition to convection, a radiative condenser also dissipates heat through radiation (FIG. 3(*b*)). Here for simplicity, it may be assumed the atmosphere may be completely transparent to radiation and solar radiation on the condenser may be completely suppressed. The maximum cooling power from radiation thus can be estimated by the total power emitted by a blackbody, i.e. $P_{rad} \cong \sigma_B T_{vapor}^4 A$, where $\sigma_B$ is the Stefan-Boltzmann constant. For 100° C. water vapor, the cooling power from radiation is as high as ~1100 $Wm^{-2}$, exceeding the solar flux (1000 Wm$^{-2}$) without concentration. Consequently, a radiative condenser ideally can condense water at 2~2.9 L m$^2$ hour$^{-1}$ (red lines in FIG. 4), exceeding the ideal solar evaporation rate (1.6 L m$^{-1}$ hour$^{-1}$). On the other hand, as shown in FIG. 4, conventional convective condenser cannot condense ambient-temperature water vapor ($T_{vapor}=T_{amb}=20°$ C.) as there is no cooling power, i.e. $P_{conv}=0$. In great contrast, a radiative condenser ideally can condense water at 0.58 L m$^{-2}$ hour$^{-1}$ (red lines in FIG. 4). Even without solar evaporation, it may have the potential to satisfy the minimum individual drinking needs for survival (~1.2 L).

Figure 6:
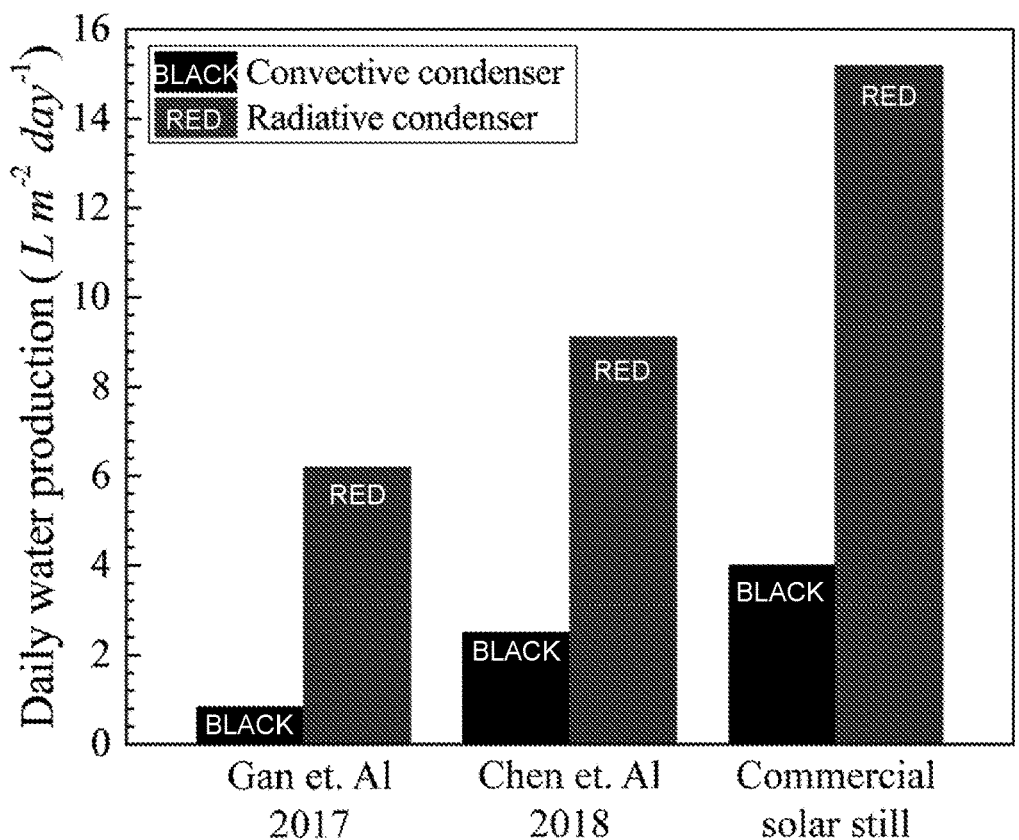
FIG. 6 is a chart showing the daily water production of several solar stills using convective condenser (black bars) and radiative condenser (red bars)

To further demonstrate the potential of radiative condenser, several existing passive water-harvesting systems that are based one solar evaporation may be analyzed. The condensers in all of them are conventional convective condensers. As shown by the black bars in FIG. 6, the measured daily water production rates in these systems are only 0.832, 2.5 and 4 L m$^{-2}$ day$^{-1}$, where the temperatures of the water vapor are 40, 48 and 60° C., respectively. In great contrast, radiative condensers can significantly boost the daily water production rates to 6.2, 9.1 and 15.2 L m$^{-2}$ day$^{-1}$, as indicated by the red bars in FIG. 6. In some embodiments radiative condensers can boost the daily water production by more than three times.

The above analyses provide the theoretical upper bound of radiative condensation. Next, the pathway towards achieving efficient radiative passive condensation in realistic situation during daytime will be discussed.

Figure 7:
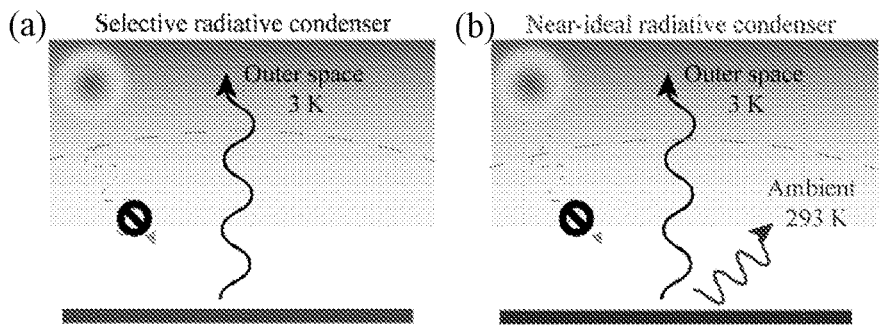
FIG. 7 shows schematics of: (a) selective radiative condenser; and (b) near-ideal radiative condenser (the selective radiative condenser only radiates to the outer space, and the near-ideal condenser radiates to both outer space and ambient air)
Figure 8:
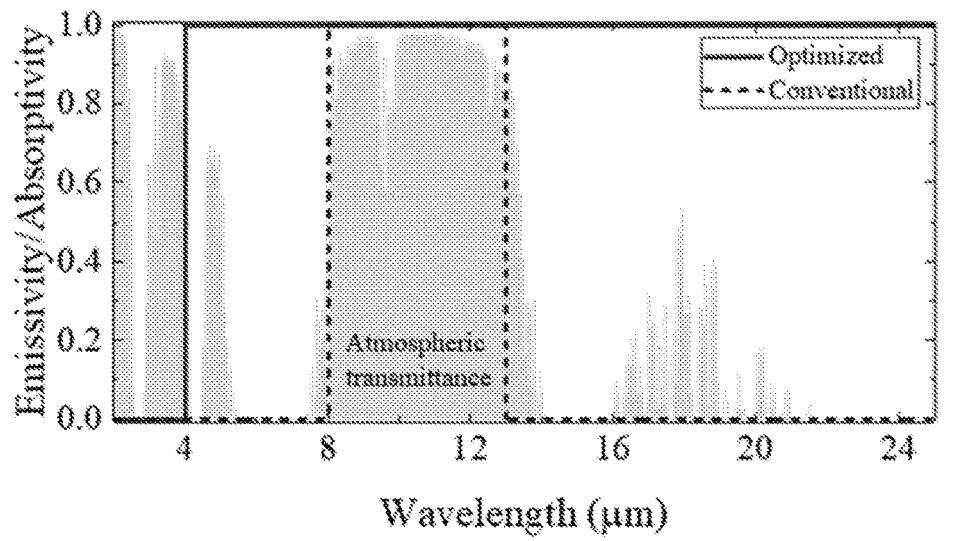
FIG. 8 is a chart showing emissivity spectra of the selective and near-ideal radiative condenser (the gray area indicates the typical atmospheric transmission spectrum)
Figure 9:
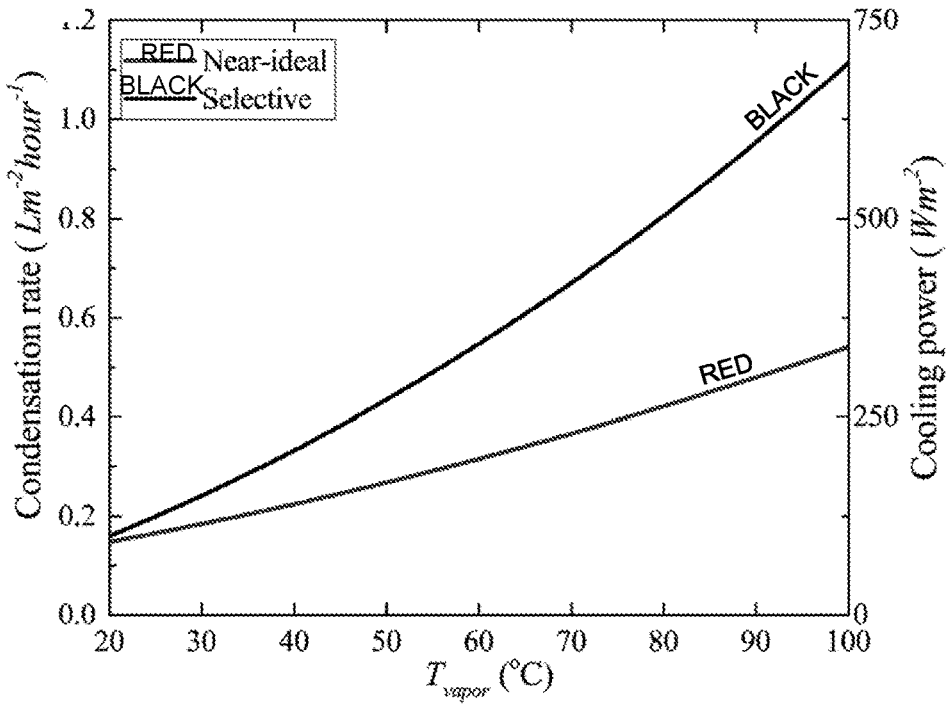
FIG. 9 is a chart showing cooling power and corresponding condensation rates of the selective and the near-ideal radiative condenser.

Daytime radiative passive condensation. For more a realistic situation where the atmosphere is partially transparent, a theoretical analysis as illustrated in FIGS. 7-9 may be performed. The gray area in FIG. 8 indicates the typical atmospheric transmission spectrum considered. Two different radiative condensers may be considered: a selective radiative condenser (FIG. 7(*a*)) and a near-ideal radiative condenser (FIG. 7(*b*)). The selective radiative condenser may have unity emissivity inside the atmospheric transparency window in the wavelength range from 8 to 13 μm and zero emissivity outside (black dashed line in FIG. 8). The optimized radiative coolers emit from 4 to 25 μm. In great contrast, the near-ideal radiative condenser may have zero emissivity in the solar radiation spectrum in the wavelength range from 0.3 to 4 μm and unity emissivity beyond 4 μm (red solid line in FIG. 8).

The differences in the emissivity between the selective and near ideal condensers results in different pathways to dissipate heat. Whereas the selective condenser can only dissipate heat to the outer space (FIG. 7(*a*)), the near-ideal condenser exchanges heat with both the outer space and the ambient air (FIG. 7(*b*)). The radiation from the condenser to the ambient air provides substantial amount of cooling power for condensation, especially when the water vapor is hot.

To quantitatively demonstrate the difference in cooling power between the selective and near-ideal condenser, the cooling power under different temperatures of water vapor may be calculated; the results may be seen in a plot in FIG. 4. The ambient temperature may be fixed at 20° C. and it may be assumed that the water vapor may be saturated. When the temperature of the water vapor may be the same with the ambient temperature, the heat flux between the near-ideal condenser and the ambient air may be almost zero. Consequently, the cooling power of the selective and the near-ideal condenser may be almost the same. As shown in FIG. 9, both can provide 100 Wm$^{-2}$ of cooling power, which indicates a condensation rate of 0.16 L m$^{-2}$ day$^{-1}$.

However, as the temperature of the water vapor increases, the condensers operates at temperatures higher than the ambient air. As a result, the near-ideal radiates a substantial amount of power to the ambient air, leading to greater cooling power and condensation rates (FIG. 9). For 100° C. water vapor, the cooling power of the near-ideal condenser may be 700 Wm$^{-2}$, 2 times larger than that of the selective condenser.

More importantly, the near-ideal radiative condenser may be easier to realize than the selective radiative condenser. Whereas the selective condenser requires complex photonic structures that are difficult fabricate, the near-ideal condenser can be realized by using low-cost and abundant polymer materials. Thus, an inexpensive daytime radiative condenser can be produced and daytime condensation of ambient-temperature water vapor can be demonstrated.

Experimental verification of daytime radiative condensation. Based on the presently-disclosed radiative cooling scheme, a cost-effective radiative cooler may be constructed, and daytime radiative condensation of room-temperature water vapor under direct sunlight may be experimentally demonstrated.

Figure 10:
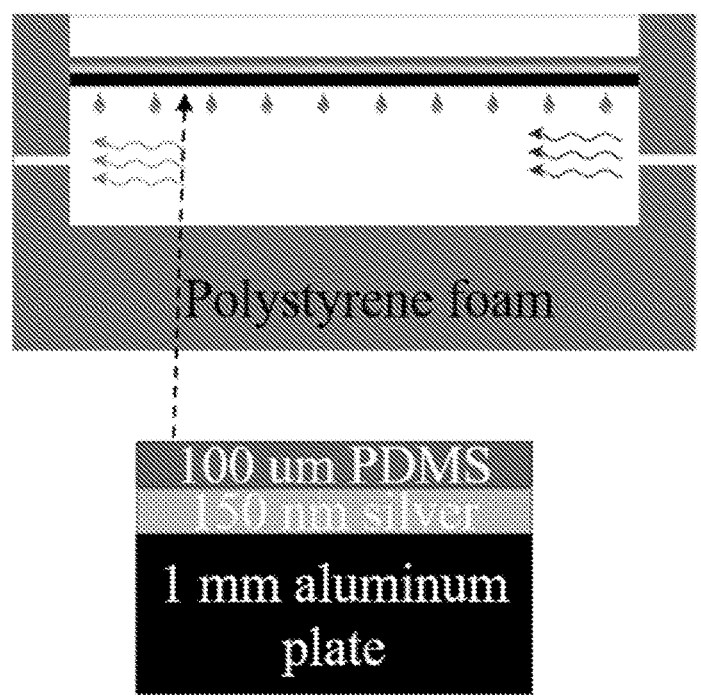
FIG. 10 is a schematic of a radiative condenser according to another embodiment of the present disclosure, wherein the radiative cooler comprises a 100 μm thick layer of PDMS, a 150 nm thick layer of silver, and a 1 mm thick aluminum plate placed inside an insulating box made of polystyrene foam, the opening of the insulating box was covered by a thin layer of polyethylene film, and the external surfaces of the box were covered by aluminized foil tape.

As shown in FIG. 10 (and inset of FIG. 11), a cost-effective exemplary radiative cooler of the present disclosure was fabricated using a 0.1 cm thick aluminum plate as the substrate. The aluminum plate had dimensions of 30.48 cm×35.56 cm. A 150 nm thick layer of silver was deposited on the first side of the aluminum plate to increase the reflectance in the solar radiation spectrum. Then, a 100 μm thick coating of polydimethylsiloxane (PDMS) was applied on the silver-coated plate. The PDMS layer may be transparent to solar radiation but emits like a blackbody from 4 to 25 μm (i.e., has good emissivity from 4 to 25 μm). The plate was then placed into an opening of insulating polystyrene foam box, such that emissions from the radiative cooling plate exit the box at the opening of the box. As water vapor flows through the box, from an inlet to an outlet, water may be able to condense at the bottom surface (i.e., second side) of the plate. To avoid condensation at the top surface of the PDMS layer (i.e., first side of the substrate), the opening of the insulating box may be covered with a thin polyethylene (PE) film, which may be transparent to the emission from the PDMS layer. The PE film was spaced apart from the first side of the substrate. The external surfaces of the insulating box were then covered with aluminized foil tape to avoid solar radiation, as shown by the picture of the prototype of fabricated condenser in FIG. 12.

For comparison, a blackbody radiative cooler and a commercial radiative cooler were fabricated on aluminum plates with the same dimensions as the embodiment described above, i.e., 30.48 cm×35.56 cm×0.1 cm. The blackbody cooler was made by painting the plate with graphite and the commercial cooler was made by covering the plate with a commercially available radiative cooling foil. The coolers were also placed inside insulating boxes as described above, each box having the same dimensions and having the external surfaces covered with aluminized foil tape. For the blackbody and commercial condensers, the openings of the boxes were both covered with thin PE films to avoid condensation at the top surfaces of the respective coolers. A convective condenser may also be fabricated by placing a bare aluminum plate inside a similar insulating box and blocking radiation by covering the opening of this box with aluminized foil tape.

Figure 14:
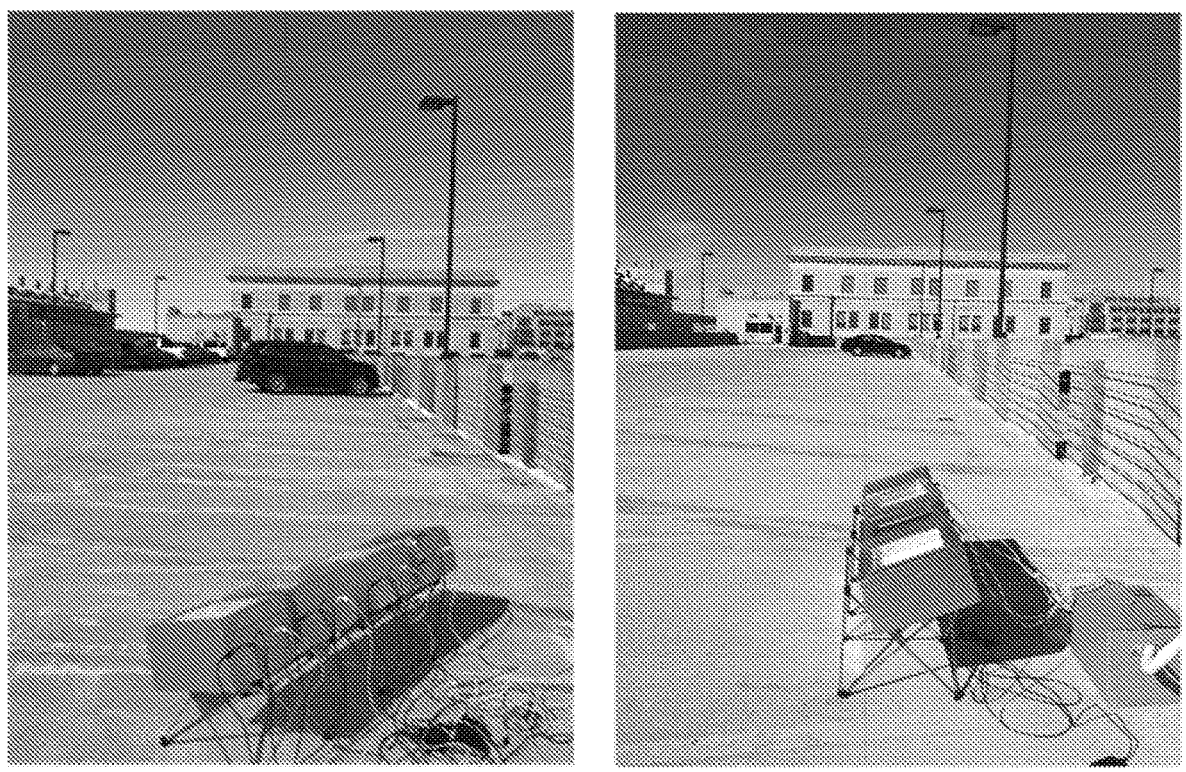
FIG. 14 contains two photographs showing the outdoor setup of an experiment, wherein condensers of varying designs were placed under direct sunlight on a top floor of a parking ramp.

All the condensers were then placed under direct sunlight as shown FIG. 14. The measurements were performed in Madison, Wis. during the month of March. Due to the low ambient temperature and relative humidity of winter, a humidifier was used to increase the local relative humidity. The humidified air was then pumped to all condensers at a constant flow rate of 0.9 L h$^{-1}$. The temperatures and relative humidities of the output air for each condenser were then recorded in real time. Because the convective condenser does not condense water vapor at room temperature, its output relative humidity was used as a reference for all the other condensers. The condensation rate then could be directly calculated from the difference between the output humidities.

Figure 15A:
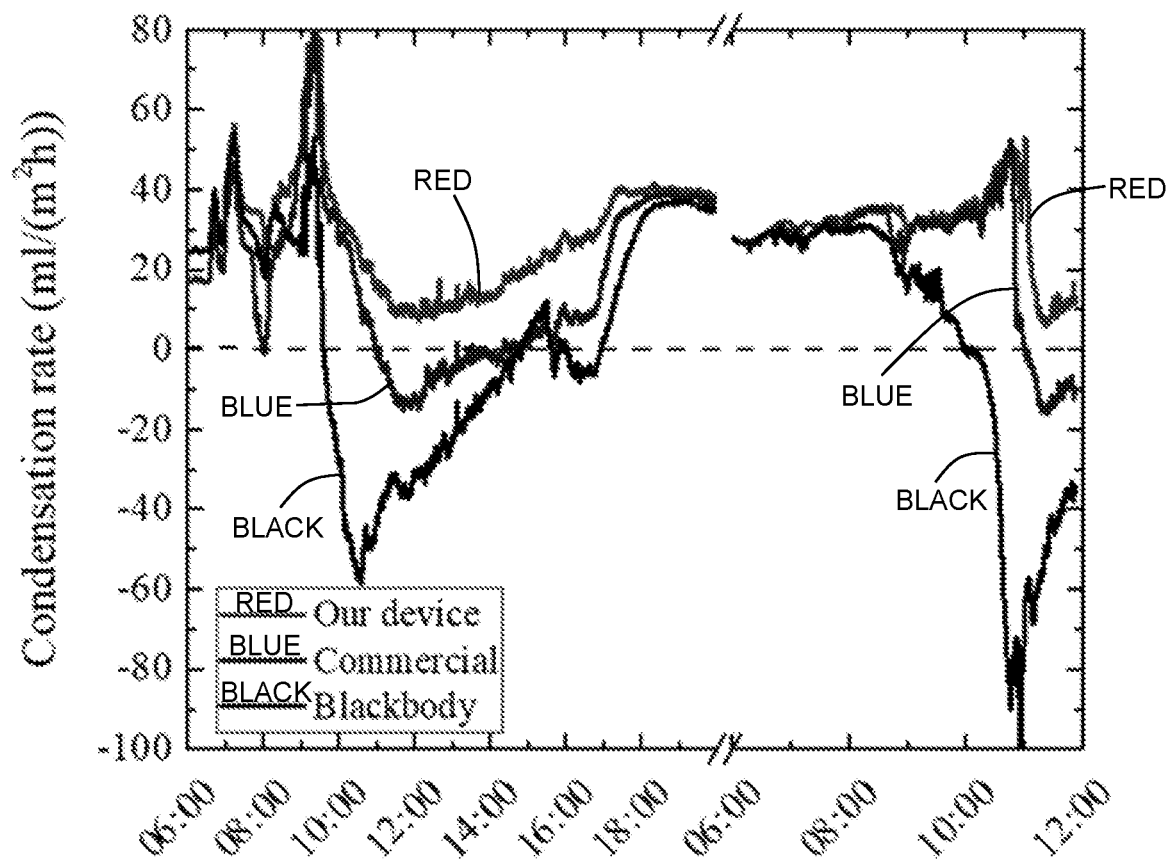
FIG. 15a is a chart showing real-time condensation rates of the presently-disclosed radiative cooler (red line), a commercial radiative cooler (blue line), and a blackbody radiative cooler (black line). The measurement was performed from March $10^{th}$ to $11^{th}$ (for simplicity, only daytime data is shown). Negative condensation rates indicate that water was being evaporated. It can be seen that the presently-disclosed radiative cooler condensed water at all times regardless of solar radiation. In contrast, the commercial and blackbody radiative coolers did not condense water during most of the daytime.
Figure 15B:
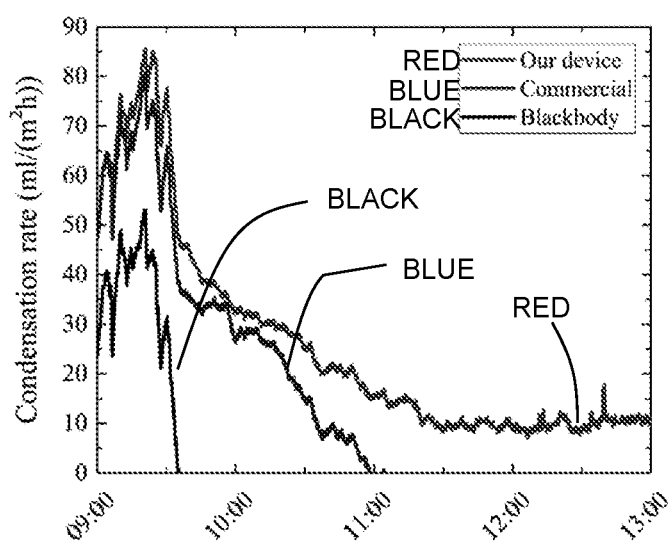
FIG. 15b is a subset of the chart in FIG. 15a, showing real-time condensation rates of the presently-disclosed radiative cooler (red line), a commercial radiative cooler (blue line), and a blackbody radiative cooler (black line), for 9:00 to 13:00 on March $10^{th}$.
Figure 16:
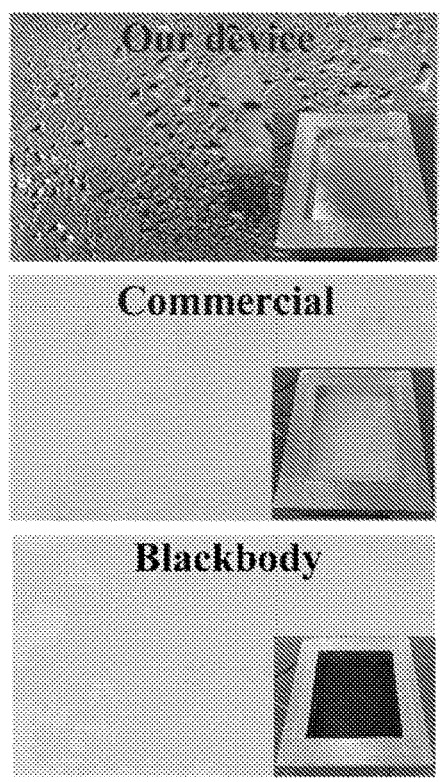
FIG. 16 shows photographs of the condensing surface for each tested condenser at noon, March $11^{th}$. Visible water droplets can only be seen on the daytime radiative condenser.
Figure 17:
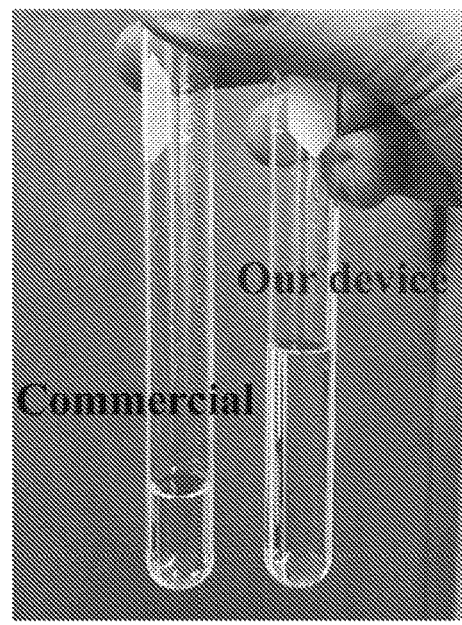
FIG. 17 shows a visual comparison between the amount of water produced by the device and the commercial nighttime condenser.

The real-time condensation rates during daytime from March 10$^{th}$ to March 11$^{th}$ are plotted in FIG. 15. The negative condensation rate indicates evaporation. Under direct sunlight at noon (FIG. 14), the blackbody condenser (blue line) and the commercial condenser (red line) did not condense water, and even evaporated water that had been condensed before sunrise. In great contrast, the radiative cooler of the present disclosure (black line) was able to condense water throughout the day, even at noon. To clearly demonstrate the difference, a picture was taken of the bottom surface of the plate for each condenser at noon, March 11$^{th}$. As shown in FIG. 16, while there was no water condensation forming on the plates of the blackbody and commercial condensers, there were visible water droplets forming on the plate of the radiative condenser of the present disclosure. The water production may be further measured by measuring the change of weight for each condenser and plotting the results in FIG. 18. The water productions from the radiative condenser of the present disclosure more than 2 times that of the blackbody and commercial condenser on each of the two test days.

Figure 11:
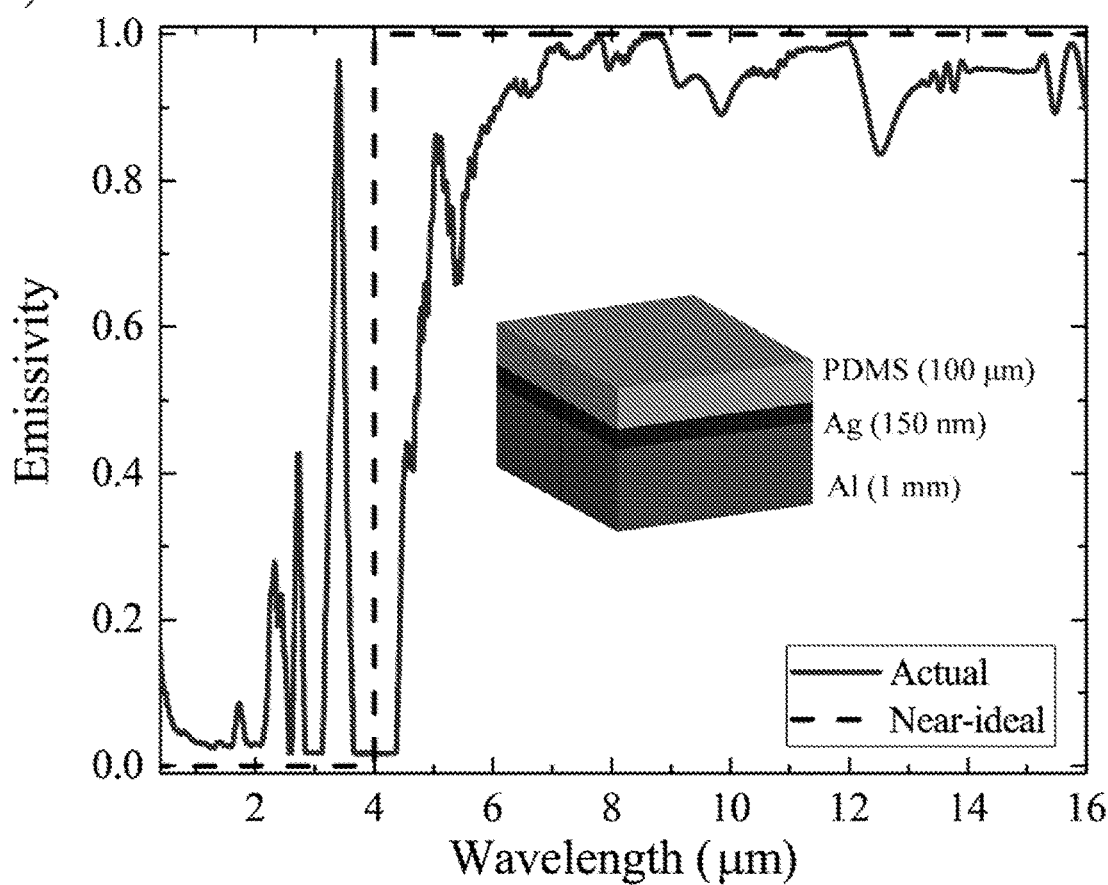
FIG. 11 is a schematic of a daytime radiative emitter according to another embodiment of the present disclosure and measured emissivity spectrum. The emitter consists of a 100 μm thick layer of PDMS, a 150 nm thick layer of silver and a 1 mm thick aluminum plate.

Experimental design and characterization. FIG. 11 shows the schematic of the radiator designed to approach the near-ideal condenser spectrum (black dashed line). It may comprise layers of polydimethylsiloxane (PDMS) and silver (Ag) and an aluminum (Al) substrate, with thickness of 100 μm, 150 nm and 1 mm, respectively. The radiation mainly arises from the PDMS layer, and solar radiation may be reflected by the Ag layer. The width and length of the Al substrate are 30.48 cm and 35.56 cm, respectively. The emissivity of the structure may be characterized using Fourier transform infrared spectroscopy and the measured emissivity spectrum is shown in FIG. 11 as red solid line. It resembles the near-ideal condenser spectrum (black dashed line) well.

Figure 12:
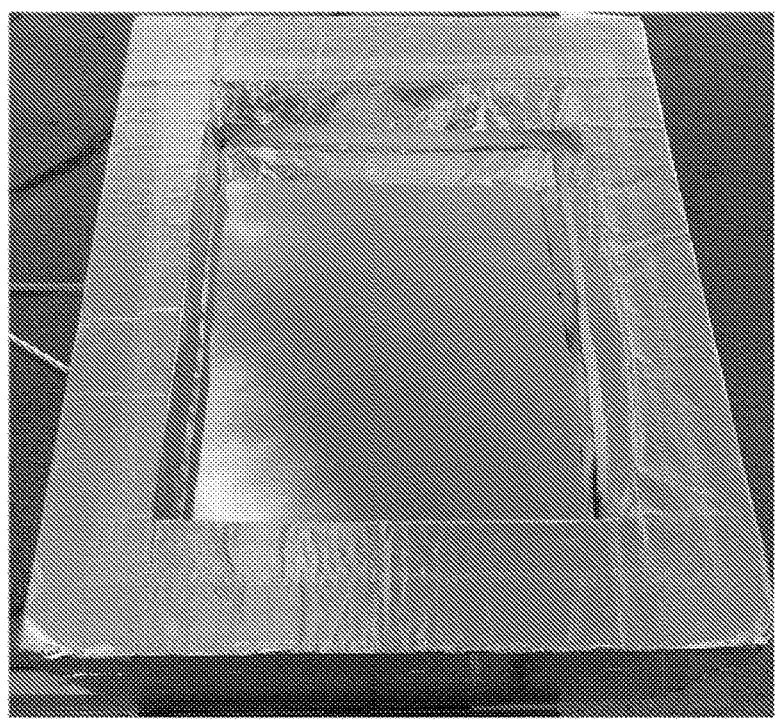
FIG. 12 is a photograph of an experimental setup of a passive cooler according to an embodiment of the present disclosure.

The radiator may be placed inside an insulating box made from polystyrene as shown in FIG. 12. The external surface of the insulating box may be covered with aluminized foil tape to reflect solar radiation. The opening of the insulating box may be covered with low-density polystyrene film to reduce convective heat losses.

Figure 13:
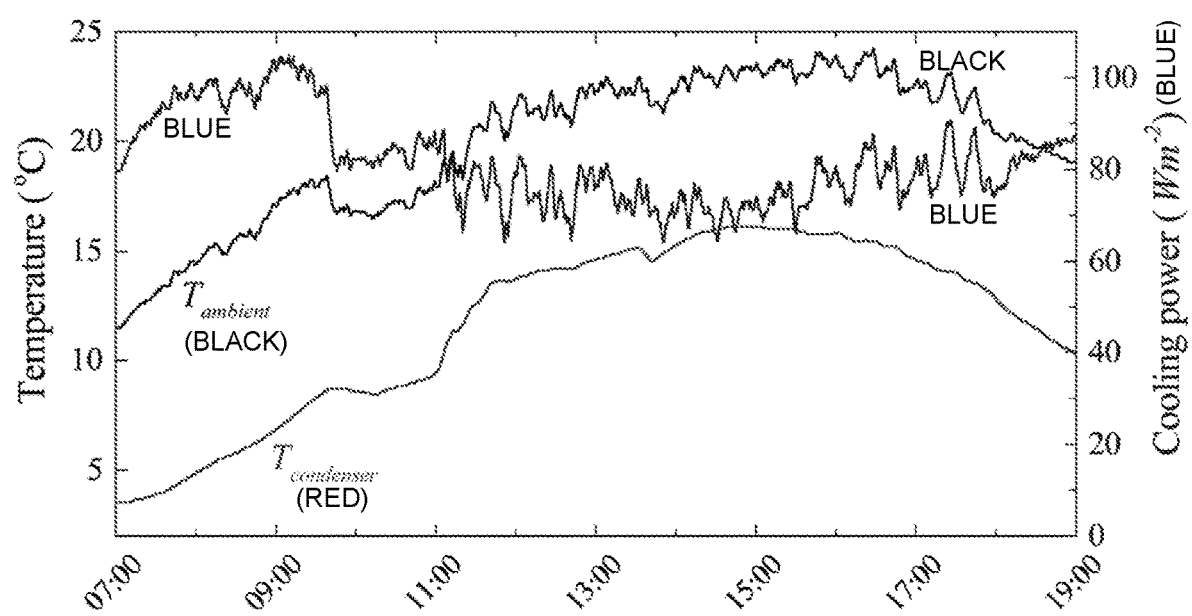
FIG. 13 is a chart showing daytime cooling power under direct sunlight of the experimental setup of FIG. 12 (the temperature of the condenser is about 8° C. lower than the ambient temperature throughout the day, corresponding to a cooling power of 80 W m'.

To characterize the cooling power of the radiative condenser under direct sunlight, it was experimentally placed on a roof at University of Wisconsin—Madison as shown by the picture in FIG. 12. The temperature of the condenser may be measured by attaching a thermocouple at center of the backside of the condenser with conductive tape. The temperature of the ambient air may be measured by placing a thermocouple inside a weather shield to avoid sunlight and wind. The measurement was performed on a sunny day with clear sky from 07:00 to 19:00. FIG. 13 shows the temperature of the condenser (red curve) and the ambient air (black curve), as well as the calculated cooling power (blue curve). The temperature of the condenser may be about 8° C. lower than the ambient temperature throughout the day, indicates a daytime cooling power of about 80 Wm$^{-2}$.

Demonstration of daytime condensation. An advantage of the daytime radiative condenser may be that it can condense ambient-temperature water vapor even under direct sunlight. To clearly demonstrate this effect, three additional experimental apparatuses were fabricated: one reference apparatus that does not condense water, one blackbody condenser and one commercial nighttime radiative condenser. All of them are configured in the same way as the daytime radiative condenser as shown in FIG. 12.

All the condensers were then placed under direct sunlight as shown by the picture in FIG. 14. Due to low ambient relative humidity (~40%) in winter and the small area of the condensers (~0.05 m$^2$), it's very difficult to observe condensation of ambient water vapor. Consequently, a humidifier may be used to increase the local relative humidity. The humidified air then may be pumped to all condensers by an air pump at a constant flow rate of 0.9 m$^3$ hour$^{-1}$. The temperature and relative humidity of the output air may be measured by directly attaching a temperature and relative humidity probe at the output outlet. The condensation rate then can be directly obtained by comparing the output absolute humidities from the condensers and the reference apparatus.

Measurements were performed at University of Wisconsin—Madison in March. A typical measurement (FIG. 15$b$) during daytime shows the condensation rates of the daytime radiative condenser (red curve), the commercial nighttime condenser (blue curve) and the blackbody condenser (black curve). It confirms that only the daytime radiative condenser that reflect solar radiation can condense water at daytime. To further visualize the daytime condensation effect, pictures were taken of the backsides of all three condensers at noon, March 11$^{th}$. The pictures are shown in FIG. 16. Visible water droplets can only be seen on the backside of the daytime condenser, confirming its daytime condensation under direct sunlight.

Figure 18:
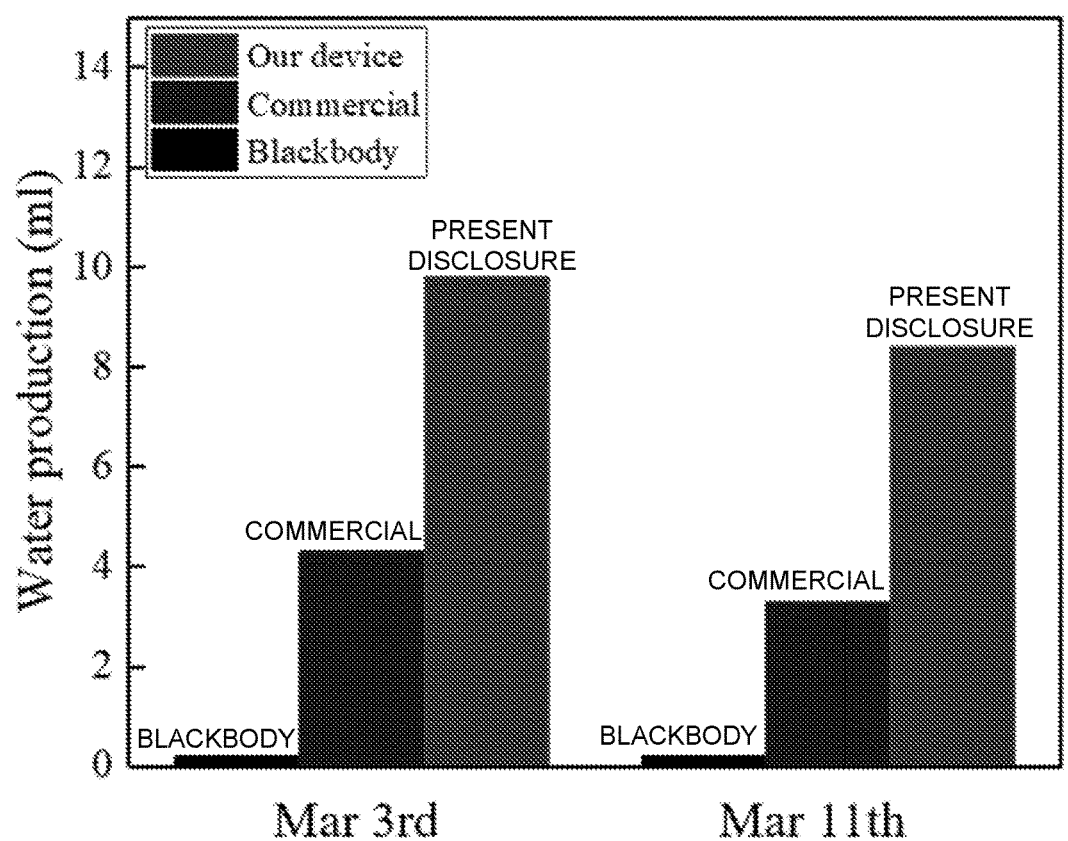
FIG. 18 is a chart showing daily water production measured at on two different days. In each case, the presently-disclosed radiative condenser (red bars) produced much more water than the commercial (blue bars) and blackbody (black bars) radiative condensers.

The daytime condensation significantly increases the overall water production. FIG. 18 shows the overall water productions over from day to night on two different days. The overall water production from the daytime condenser may be almost twice that from the commercial nighttime condenser. Moreover, the blackbody condenser completely evaporates its nighttime water production due to absorption of solar radiation during daytime, leading to almost zero water production.

Transparent radiative cooler for solar still. As discussed previously, most of existing radiative coolers are designed to reflect most of the solar radiation. However, the condenser in conventional solar stills may have to be transparent to let solar radiation reach the basin (FIG. 5). Consequently, these exiting radiative coolers cannot be used in conventional solar stills.

To overcome this issue, another embodiment of the present disclosure may be a simple radiative cooling scheme that may be transparent to solar radiation. In such embodiments, a coating of, for example, PDMS may be applied to a glass substrate. Both PDMS and glass are highly transparent to solar radiation but emit efficiently in the mid-infrared region (and PDMS even more emissive in the subject region than glass). By replacing the glass cover (FIG. 5) with an embodiment of the presently disclosed transparent radiative cooler, the condensation rate can be improved by more than 50%.

Transparent radiative condenser for solar still. Most of existing radiative cooling systems are designed to reflect the solar radiation, making it difficult to implement them in solar evaporation systems. Herein proposed is a transparent radiative condenser that can be easily implemented in current solar evaporation systems. The daily water production can be approximately increased by more than 100%.

Figure 19:
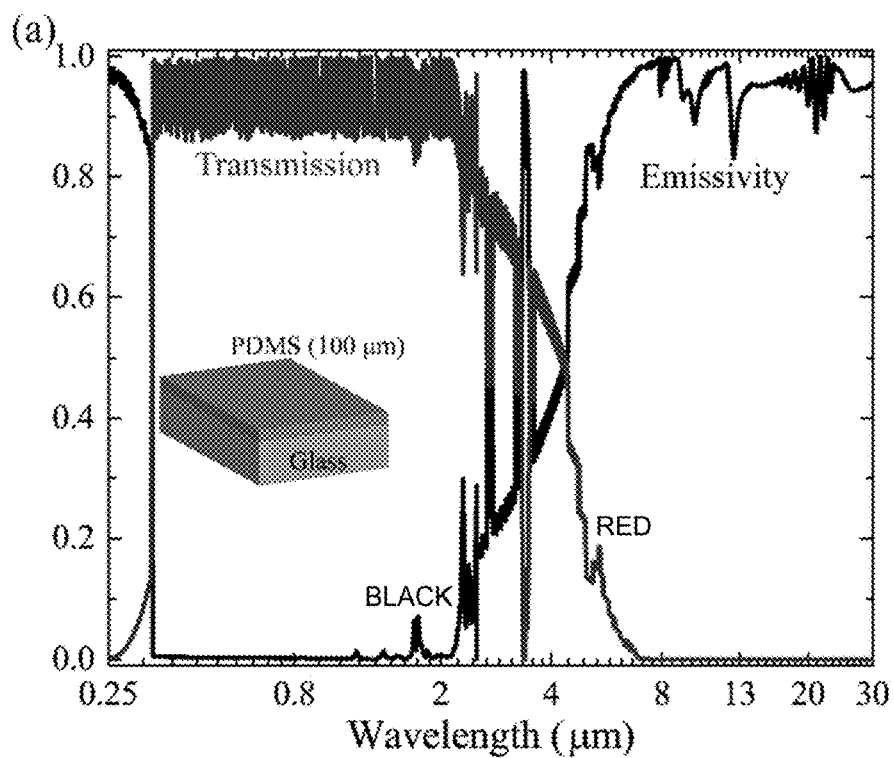
FIG. 19 shows a transparent radiative condenser. (a) Schematic of the structure of the transparent radiative condenser and its transmission (red line) and emissivity (black line) spectra. It comprises a layer of PDMS with a thickness of 100 μm, on top of a glass substrate. (b) The transparent condenser can be readily implemented in existing solar stills.
Figure 19:
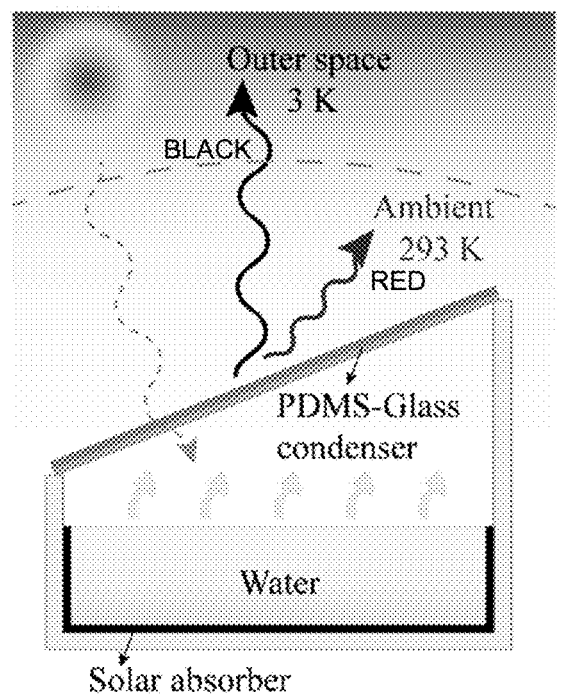

FIG. 19a shows the schematic of the transparent radiative condenser and its' transmission (red curve) and emissivity (black curve) spectra. It may comprise a layer of PDMS on top of a glass substrate, with a thickness of 100 μm. Both PDMS and glass are highly transparent in the solar radiation spectrum, allowing solar radiation passes through it (FIG. 19b); and PDMS is high emissive in the wavelength range from 4 to 30 μm, enabling efficient radiative condensation as discussed previously. Moreover, glass is the most common convective condensers in solar evaporation systems. A thin layer of PDMS can be readily applied on top of the glass existing solar evaporation systems and accelerate water condensation through radiative cooling. Comparing to plain glass cover, the PDMS coated glass increases the water production by about 20%.

Maximum condensation rate for condensing ambient air may be 0.16~0.32 L $m^{-2}$ $hour^{-1}$ for ambient temperature from 20 to 40° C. This limit is difficult to approach in due to heat losses.

The following Statements provide non-limiting examples of passive coolers, a radiator for a condenser, and methods of making passive coolers of the present disclosure:

Statement 1. A passive cooler, comprising: a thermally conductive substrate described herein having a first side and a second side opposite the first side, where the first side has a solar reflectance of at least 95%; and a coating described herein disposed on at least a portion of the first side of the substrate, the coating being transparent or substantially transparent to solar radiation and having emissivity of greater than 0.95 over a majority of the spectral band between 4 and 25 μm; and a housing described herein having one or more insulative walls, where the insulative walls together with the substrate define a vapor flow channel from an inlet of the housing to an outlet of the housing such that the second side of the substrate is exposed to vapor flowing through the channel;

Statement 2. A passive cooler according to Statement 1, where the thermally conductive substrate has a conductive heat transfer coefficient of at least 3 Wm-2K-1;

Statement 3. A passive cooler according to Statement 1 or Statement 2, where the substrate comprises a reflective layer described herein on the first side, where the reflective layer imparts solar reflectivity;

Statement 4. A passive cooler according to Statement 3, where the reflective layer is silver;

Statement 5. A passive cooler according to any one of the preceding Statements, further comprising a fan described herein configured to move vapor through the vapor flow channel of the housing;

Statement 6. A passive cooler according to any one of the preceding Statements, further comprising a transparent cover described herein spaced apart from the first side of the substrate;

Statement 7. A passive cooler according to Statement 6, where the coating is at least 50 μm thick;

Statement 8. A passive cooler according to any one of the preceding Statements, where the substrate is aluminum;

Statement 9. A passive cooler according to any one of Statements 1-7, where the substrate is glass;

Statement 10. A passive cooler according to any one of the preceding Statements, where the coating is a silicon-based organic polymer;

Statement 11. A passive cooler according to Statement 10, where the silicon-based organic polymer is polydimethylsiloxane ("PDMS");

Statement 12. A radiator for a condenser, comprising: a thermally conductive substrate described herein having a first side and a second side opposite the first side, where the first side has a solar reflectance of at least 95%; a coating described herein disposed on at least a portion of the substrate, the coating being transparent to solar radiation and having emissivity of greater than 0.95 over a majority of the spectral band between 4 and 25 μm;

Statement 13. A method of making a passive cooler, comprising: forming a radiative cooling plate by providing a thermally conductive substrate described herein having a first side and a second side, the first side having a solar reflectance of at least 95%, and applying a coating described herein onto the first side, where the coating is transparent or substantially transparent to solar radiation and has emissivity of greater than 0.95 over a majority of the spectral band between 4 and 25 μm; and placing the radiative cooling plate within an opening of an insulating housing described herein such that an emission from the first side of the radiative cooling plate exits the insulating housing via the opening and the second side of the cooling plate is exposed to a vapor flow channel of the housing;

Statement 14. A method according to Statement 13, further comprising covering the opening with a transparent cover spaced apart from the first side of the substrate;

Statement 15. A method according to any of Statements 13-14, further comprising covering an external surface of the housing with a reflective layer;

Statement 16. A method according to any one of Statements 13-15, where the reflective layer is a foil tape;

Statement 17. A method according to Statement 16, where the foil tape is an aluminized foil tape;

Statement 18. A method according to any one of Statements 13-16, where the thermally-conductive substrate includes a reflective layer on the first side;

Statement 19. A method according to any one of Statements 13-17, where the coating is a silicon-based organic polymer;

Statement 20. A method according to Statement 19, where the silicon-based organic polymer is polydimethylsiloxane ("PDMS");

Statement 21. A method of condensing water, comprising: providing a passive cooler according to any one of Statements 1-11; and passing water vapor through the vapor flow channel of the passive cooler such that at least a portion of the water vapor condenses on the second side of the substrate to yield condensate; and Statement 22. A method according to Statement 20, where the first side of the substrate is exposed to a moving air mass, such that thermal energy is emitted from the passive cooler via convection.

Although the present disclosure has been described with respect to one or more particular embodiments and/or examples, it will be understood that other embodiments and/or examples of the present disclosure may be made without departing from the scope of the present disclosure.

The steps of the method described in the various embodiments and examples disclosed herein are sufficient to carry out the methods of the present invention. Thus, in an embodiment, the method consists essentially of a combination of the steps of the methods disclosed herein. In another embodiment, the method consists of such steps.

What is claimed is:

1. A passive cooler, comprising:
   a thermally conductive substrate having a first side and a second side opposite the first side, wherein the first side has a solar reflectance of at least 95%;
   a coating disposed on at least a portion of the first side of the substrate, the coating being transparent or substantially transparent to solar radiation and having emissivity of greater than 0.95 over a majority of the spectral band between 4 and 25 μm; and
   a housing having one or more insulative walls, wherein the insulative walls together with the substrate define a vapor flow channel from an inlet of the housing to an outlet of the housing such that the second side of the substrate is exposed to vapor flowing through the channel.

2. The passive cooler of claim 1, wherein the thermally conductive substrate has a conductive heat transfer coefficient of at least 3 $Wm^{-2}K^{-1}$.

3. The passive cooler of claim 1, wherein the substrate comprises a reflective layer on the first side, wherein the reflective layer imparts solar reflectivity.

4. The passive cooler of claim 3, wherein the reflective layer is silver.

5. The passive cooler of claim 1, further comprising a fan configured to move vapor through the vapor flow channel of the housing.

6. The passive cooler of claim 1, further comprising a transparent cover spaced apart from the first side of the substrate.

7. The passive cooler of claim 6, wherein the coating is at least 50 μm thick.

8. The passive cooler of claim 1, wherein the substrate is aluminum.

9. The passive cooler of claim 1, wherein the substrate is glass.

10. The passive cooler of claim 1, wherein the coating is a silicon-based organic polymer.

11. The passive cooler of claim 10, wherein the silicon-based organic polymer is polydimethylsiloxane ("PDMS").

12. A method of making a passive cooler, comprising:
    forming a radiative cooling plate by providing a thermally conductive substrate having a first side and a second side, the first side having a solar reflectance of at least 95%, and applying a coating onto the first side, wherein the coating is transparent or substantially transparent to solar radiation and having emissivity of greater than 0.95 over a majority of the spectral band between 4 and 25 μm; and
    placing the radiative cooling plate within an opening of an insulating housing such that an emission from the first side of the radiative cooling plate exits the insulating housing via the opening and the second side of the cooling plate is exposed to a vapor flow channel of the housing.

13. The method of claim 12, further comprising covering the opening with a transparent cover spaced apart from the first side of the substrate.

14. The method of claim 12, further comprising covering an external surface of the housing with a reflective layer.

15. The method of claim 14, wherein the reflective layer is a foil tape.

16. The method of claim 15, wherein the foil tape is aluminized foil tape.

17. The method of claim 12, wherein the thermally-conductive substrate includes a reflective layer on the first side.

18. The method of claim 12, wherein the coating is a silicon-based organic polymer.

19. The method of claim 18, wherein the silicon-based organic polymer is polydimethylsiloxane ("PDMS").

20. A method of condensing water, comprising:
    providing a passive cooler according to claim 1; and
    passing water vapor through the vapor flow channel of the passive cooler such that at least a portion of the water vapor condenses on the second side of the substrate to yield condensate.

21. The method of claim 20, wherein the first side of the substrate is exposed to a moving air mass, such that thermal energy is emitted from the passive cooler via convection.

* * * * *